United States Patent Office 3,180,888
Patented Apr. 27, 1965

3,180,888
AMINOHALOBORANES AND PREPARATION THEREOF
Robert J. Brotherton, Fullerton, Calif., assignor to United States Borax & Chemical Corporation, Los Angeles, Calif., a corporation of Nevada
No Drawing. Filed Aug. 17, 1960, Ser. No. 50,080
11 Claims. (Cl. 260—543)

The present invention relates as indicated to the preparation of aminohaloboranes and has more particular reference to a new process for the preparation of mixed alkyl and/or aryl aminohaloboranes.

It is the principal object of the present invention to provide a new and novel process for the preparation of mixed alkyl and/or aryl aminohaloboranes.

A further object is to provide a method for preparing mixed alkyl and/or aryl aminohaloboranes which is economical, efficient, and results in substantially high yields of substantially pure product.

Other objects of the invention will appear as the description proceeds.

To the accomplishment of the foregoing and related ends, said invention then comprises the features hereinafter fully described and pointed out in the claims, the following description setting forth in detail certain illustrative embodiments of the invention, these being indicative, however, of but a few of the various ways in which the principle of the invention may be employed.

Broadly stated, the present invention comprises the method of producing aminohaloboranes having the general formula

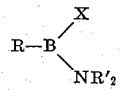

which comprises the reaction of a secondary amine with a dihalo-organoborane and reacting the resultant reaction mass with a tertiary amine selected from the group consisting of pyridine and tertiary alkyl amines having primary and secondary alkyl groups containing from 1 to 4 carbon atoms according to the general equation:

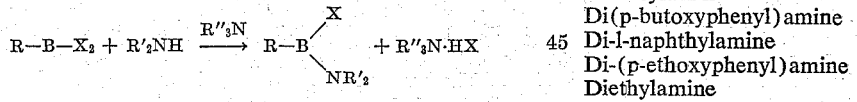

where X is a halogen, R is selected from the group consisting of alkyl groups containing from 1 to 6 carbon atoms and aryl groups, R' is selected from the group consisting of alkyl groups containing from 1 to 6 carbon atoms and aryl groups and R"$_3$N is a tertiary amine.

The dihalo-organoboranes used as reactants in the present process can be obtained, for example, from the reaction of a Grignard reagent or an alkali metal organic compound with a boron trihalide. They can be characterized by the general formula R–B–X$_2$ where X is a halogen and R is an alkyl group containing from 1 to 6 carbon atoms or an aryl group. The aryl groups applicable to these compounds and to the present invention include phenyl, phenyl substituted phenyl, naphthyl, and alkyl and alkoxyl substituted phenyls where the alkyl and alkoxyl groups contain from 1 to 5 carbon atoms. In the preferred embodiment of the invention I use chloro and bromo, dihalo-organoboranes.

The following list is a partial enumeration of the dihalo-organoboranes applicable to the present invention:

Dichlorophenylborane
Dibromoethylborane
Dibromo-4-biphenylborane
Dichloro-n-propylborane
Dibromoisopropylborane
Dichloro-p-anisylborane
Dibromo-p-ethylphenylborane
Dichloro-1-naphthylborane
Dibromo-p-hexylphenylborane
Dichloro-n-butylborane
Dichloroisobutylborane
Methyldibromoborane
Methylichloroborane
Dichloro-p-butoxyphenylborone
Dibromo-p-ethoxyphenylborane It is clearly understood that the foregoing is only a representative list of the more common dihalo-organoboranes which are applicable to the present invention. As for the halogen components, the iodo and fluoro compounds are also applicable to the present invention.

The secondary amines used in the present process and their preparations are well known to those in the art. As seen in the foregoing broadly stated paragraph, they have the general formula R'$_2$NH where R' is an alkyl group containing from 1 to 6 carbon atoms or an aryl group. Secondary amines having aryl groups which are comprised of phenyl, naphthyl, phenyl substituted phenyl, and alkyl and alkoxyl substituted phenyl where the alkyl and alkoxyl groups contain from 1 to 5 carbon atoms are all equally applicable to the present invention.

The following list is illustrative of the secondary amines which can be used in the present invention:

Dimethylamine
Diisopropylamine
Di-n-propylamine
Di-n-butylamine
Diisobutylamine
Diphenylamine
Dianisylamine
Di(p-butoxyphenyl)amine
Di-1-naphthylamine
Di-(p-ethoxyphenyl)amine
Diethylamine
Di-(p-ethylphenyl)amine
Di-(4-biphenyl)amine As stated previously, the tertiary amines applicable to the present invention are tertiary alkyl amines having primary and secondary alkyl groups containing from 1 to 4 carbon atoms and pyridine.

So that the present invention is more clearly understood, the following examples are given for illustrative purposes:

I. A solution of 35.30 grams (0.22 mole) of dichlorophenylborane in 250 ml. of pentane was cooled to 0° C. in an inert atmosphere and 9.99 grams (0.22 mole) of dimethylamine was added slowly. The resulting mixture was warmed to room temperature and 22.26 grams (0.22 mole) of triethylamine in 100 ml. of pentane was added rapidly. The reaction mixture was then agitated for about 8 hours and the solid amine-hydrochloride was removed by filtration. The pentane was removed at reduced pressure and the residue was distilled to give 26.68 grams (71.6% yield) of chloro(dimethylamino)-phenylborane. Chemical analysis yielded the following results.

Calculated for $C_8H_{11}NBCl$: C=57.38%, B=6.54%, H=6.58%, N=8.37%, mol. wt.=167. Found in product: C=57.79%, B=6.49%, H=6.73%, N=8.0%, mol. wt.=167.

II. A solution of 46.8 grams (0.42 mole) of dichloroethylborane in 300 ml. of pentane was cooled to −80° C. in an inert atmosphere and 19.04 grams (0.42 mole) of dimethylamine was added. The resulting mixture was warmed to room temperature and 42.7 grams (0.42 mole) of triethylamine was added rapidly. The mixture was then agitated for about 8 hours and the solid amine-hydrochloride was removed by filtration. The pentane was removed at reduced pressure and the residue was distilled to give 32.20 grams (64% yield) of chloro-(dimethylamino)ethylborane.

Chemical analysis yielded the following results.

Calculated for $C_4H_{11}BClN$: C=40.3%, B=9.08%, H=9.03%, N=11.74%, mol. wt.=119. Found in product: C=41.6%, B=8.90%, H=9.30%, N=11.50%, mol. wt.=119.

III. Example I was repeated using pyridine in place of triethylamine. The results were essentially the same as in Example I.

IV. A solution of 55.72 grams (0.20 mole) of dichloro-p-anisylborane in 300 ml. of pentane was cooled to −80° C. in an inert atmosphere and 14.6 grams (0.20 mole) of diethylamine was added. The resulting mixture was warmed to room temperature and 15.82 grams (0.20 mole) of pyridine was added rapidly. The mixture was then agitated for about 12 hours and the solid amine-hydrochloride was removed by filtration. The pentane was removed at reduced pressure and the residue was distilled to give 37.12 grams (68.2% yield) of chloro-(diethylamino)-p-anisylborane. Chemical analysis yielded the following results.

Calculated for $C_{11}H_{18}OBClN$: B=5.10%, C=62.18%, H=8.48%, N=6.60%, mol. wt.=212. Found in product: B=5.01%, C=62.38%, H=8.54%, N=6.47%, mol. wt.=211.

V. A solution of 55.68 grams (0.30 mole) of dibromomethylborane in 300 ml. of pentane was cooled to −80° C. in an inert atmosphere and 74.1 grams (0.30 mole) of di-(p-ethylpentyl)amine was added. The resulting mixture was warmed to room temperature and 42.9 grams (0.30 mole) of tri-n-propylamine in a 100 ml. of pentane was added rapidly. The mixture was then agitated for 8 hours and the solid amine-hydrochloride was removed by filtration. The pentane was removed at reduced pressure and the residue was distilled to give 70.69 grams (67% yield) of bromo-(di-p-ethylphenylamino)methylborane.

Chemical analysis yielded the following results.

Calculated for $C_{17}H_{23}BBrN$: C=63.69%, B=3.08%, H=6.54%, N=3.98%, mol. wt.=352. Found in product: C=64.14%, B=3.03%, H=6.76%, N=3.86%, mol. wt.=350.

As can be seen from the foregoing examples and description, a wide variety of aminohaloboranes can be prepared using the present invention. The present process is efficient and economical, and results in high yields of substantially pure product.

The present compounds will be found to be extremely valuable as chemical intermediates in the production of diboron compounds. Diboron compounds and their preparation from the compounds of the present invention are described and claimed in applicant's application Serial No. 50,860, filed August 22, 1960, and now U.S. Patent No. 3,119,863. They also find use as herbicides when used alone or in combination with other organic and/or inorganic herbicidal materials.

Other modes of applying the principle of the invention may be employed provided the features stated in any of the following claims or the equivalent of such be employed.

I, therefore, particularly point out and distinctly claim as my invention:

1. The method of producing aminohaloboranes having the formula

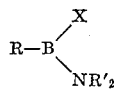

which comprises the reaction of a secondary amine having the formula $R'_2NH$ with a dihalo-organoborane having the formula $R-B-X_2$ in an inert hydrocarbon solvent and reacting the resultant reaction mass with a tertiary amine selected from the group consisting of pyridine and $R''_3N$ where X is a halogen selected from chlorine and bromine, R and R' are radicals selected from the group consisting of alkyls having from 1 to 6 carbon atoms, phenyl, alkyl substituted phenyl, said alkyl substituents having from 1 to 5 carbon atoms, alkoxy substituted phenyl, said alkoxy substituents having from 1 to 5 carbon atoms, phenyl substituted phenyl and naphthyl, and R'' is a radical selected from the group consisting of primary and secondary alkyls having from 1 to 4 carbon atoms.

2. The method of claim 1 where said secondary amine is reacted with said dihalo-organoborane at a temperature of from about 0° to about −80° C. in an inert atmosphere, allowing the resultant mass to warm to about ambient temperature and reacting said resultant mass with said tertiary amine.

3. The method of producing chloro(dimethylamino)-phenylborane which comprises reacting dimethylamine and dichlorophenylborane at 0° C. in a hydrocarbon solvent and in an inert atmosphere, allowing the reaction mass to warm to ambient temperature, rapidly adding triethylamine to said mixture, agitating the resultant reaction mass for about 8 hours, removing the solids by filtration and recovering substantially pure chloro(dimethylamino)phenylborane from the filtrate.

4. The method of producing chloro(dimethylamino)-ethylborane which comprises reacting dimethylamine and dichloroethylborane at about −80° C. in a hydrocarbon solvent and in an inert atmosphere, allowing the reaction mass to warm to ambient temperature, rapidly adding triethylamine to said mixture, agitating the resultant reaction mass for about 8 hours, removing the solids by filtration and recovering substantially pure chloro(dimethylamino)ethylborane from the filtrate.

5. The method of producing bromo(di-p-ethylphenyl-amino)methylborane which comprises reacting di(p-ethyl-phenyl)amine with dibromomethylborane at −80° C. in a hydrocarbon solvent and in an inert atmosphere, allowing the reaction mass to warm to ambient temperature, rapidly adding tri-n-propylamine to said mixture, agitating the resultant reaction mass for about 8 hours, removing the solids by filtration and recovering substantially pure bromo(di-p-ethylphenylamino)methylborane from the filtrate.

6. The method of producing chloro(diethylamino)-p-anisylborane which comprises reacting diethylamine with dibromo-p-anisylborane at about −80° C. in a hydrocarbon solvent and in an inert atmosphere, allowing the reaction mass to warm to ambient temperature, rapidly adding pyridine to said mixture, agitating the resultant reaction mass for about 12 hours, removing the solids by filtration and recovering substantially pure bromo(diethylamino)-p-anisylborane from the filtrate.

7. An aminohaloborane of the formula

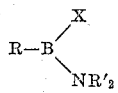

where X is a halogen selected from chlorine and bromine, and R and R' are selected from the group consisting of alkyl of 1 to 6 carbon atoms, phenyl, alkyl substituted phenyl, said alkyl substituents having from 1 to 5 carbon atoms, alkoxy substituted phenyl, said alkoxy substituents having from 1 to 5 carbon atoms, phenyl substituted phenyl, and naphthyl, when R is alkyl at least one R' is selected from the group consisting of phenyl, alkyl substituted phenyl, said alkyl substituents having from 1 to 5 carbon atoms, alkoxy substituted phenyl, said alkoxy substituents having from 1 to 5 carbon atoms, phenyl substituted phenyl, and naphthyl.

8. Chloro(dimethylamino)phenylborane.
9. Bromo(di-p-ethylphenylamino)methylborane.
10. Chloro(diethylamino)-p-anisylborane.
11. Chloro(diphenylamino)phenylborane.

References Cited by the Examiner

Becker: Z. Anorg. u. allgem. Chem., volume 289, pages 262–278 (1957).

Erickson et al.: Abstract of Papers, 136th A.C.S. Meeting, Sept. 13–18, 1959, Atlantic City, New Jersey, p. 54–N.

Gerrard et al.: "Chem. and Ind. (London)," 1958, page 1259.

Gerrard et al.: Chem. and Ind. (London), volume of 1958, pages 3073 to 3076.

Gunderboy et al.: Inorg. Chem., vol. 1, May 1962, pp. 349–355.

Lockhart: J. Chem. Soc., April 1962, pp. 1197–1201.

Mikhailov et al.: "Zhur. Okshehei Khim," vol. 29, pages 1483–1486 (1959).

Niedenzu et al.: J. Am. Chem. Soc., vol. 82, Aug. 20, 1960, pp. 4223–4228.

LORRAINE A. WEINBERGER, *Primary Examiner.*

LEON ZITVER, CHARLES B. PARKER, *Examiners.*